3,032,535
PREPARATION OF POLYTHIOETHERS

Hans Holtschmidt, Koln-Stammheim, Germany, assignor, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Nov. 3, 1958, Ser. No. 771,221
Claims priority, application Germany Nov. 8, 1957
13 Claims. (Cl. 260—79)

This invention relates generally to the preparation of polythioethers and, more particularly, to an improved method for condensing thiodiglycol to form a polythioether having terminal hydroxyl groups suitable for use in the preparation of plastics.

It has been proposed heretofore to condense thiodiglycol to prepare a thioether of greater molecular weight. In accordance with one of the heretofore known processes, thiodiglycol is heated in the presence of a catalytic amount of p-toluene sulfonic acid or other suitable etherification catalyst. The resulting polycondensate usually contains only about 40 percent to about 60 percent of the desired polythioether because large quantities of thioxane and dithiane having the following formulae

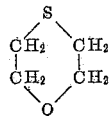

and

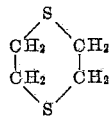

are produced along with the desired polythioether. The thioxane is formed by closing of the ring during the dehydration process while dithiane is formed by splitting two mols of ethylene oxide and two mols of water from two mols of thiodiglycol. Because of the presence of these ring compounds, the product has an undesirable dark color and is unsuitable for the preparation of plastics. Moreover, it is practically impossible to prepare a polythioether having a specific hydroxyl number because it is impossible to accurately predict the proportion of the product which will be the desired polythioether glycol. Ordinarily, the degree of polycondensation can be determined by measuring the amount of water split off during the condensation but this is impossible when the undesirable secondary reactions take place. It has also been proposed to prepare polycondensates having the formula HO—[(CH$_2$)$_2$—S—(CH$_2$)$_2$—O]$_n$H, in which $n$ is two or more, by condensing thiodiglycol in the presence of phosphoric acid or acid phosphoric acid derivatives. This process using these etherification catalysts also has the disadvantage of producing a relatively large amount of undesirable secondary reaction products.

It is, therefore, an object of this invention to provide a novel and improved process for condensing thiodiglycol to form a thioether of greater molecular weight. Another object of the invention is to provide a novel catalyst for the condensation of thiodiglycol. Still another object of the invention is to provide a process for making thiodiglycol which avoids the formation of undesirable side reaction products in the resulting product. A more specific object of the invention is to provide a method for condensing thiodiglycol to produce a thioether having terminal hydroxyl groups which is adapted for preparing plastic materials, such as, for example, by reaction with a polyisocyanate.

Generally speaking, the foregoing objects and others are accomplished in accordance with this invention by heating thiodiglycol in admixture with a catalytic amount of an organic compound containing at least one amine and at least one —SO$_3$H group until water is split off and condensation occurs with the preparation of a polythioether of greater molecular weight than thiodiglycol. More specifically, the invention contemplates a process for preparing a polythioether having terminal hydroxyl groups which is substantially free from undesirable side reaction products, such as, for example, thioxane and dithiane, which process involves heating thiodiglycol preferably at a temperature of at least 20° C. while the thiodiglycol is mixed with a catalytic amount of an organic compound containing both amine and —SO$_3$H groups until water is split off and has been separated therefrom. In a preferred embodiment of the invention, the latter stages of the condensation are conducted at a pressure below atmospheric pressure. Preferably, from about 0.01 percent to about 10 percent of the novel catalyst is used. More than 10 percent catalyst is seldom required but can be used, if desired.

In accordance with this invention, the length of the etherification process can be varied in order to produce a polythioether of any suitable molecular weight at least equal to the molecular weight of the condensate of two mols of thiodiglycol. It is preferred to produce a product of at least 500 molecular weight if the product is to be used for making plastics, such as, for example, by reacting it with a polyisocyanate to form a polyurethane plastic. The undesirable odor which is ordinarily inherent in polythioethers prepared by condensation of thiodiglycol is not present in the product because secondary reaction products, such as thioxane and dithiane, are not produced in sufficient quantity to impart an unpleasant odor to the product. The process provided by this invention consistently produces polythioethers in yields of from about 90 percent up to about 98 percent or more. Less catalyst is required in this reaction than is ordinarily required when phosphoric acid is used. As indicated hereinbefore, any catalytic amount of catalyst may be used but ordinarily the amount required will vary from about 0.01 percent to about 10 percent and most preferably the amount of catalyst will be within the range of from about 0.05 percent to about 0.2 percent.

Any suitable amino sulfonic acid, aliphatic, cycloaliphatic or aromatic can be used as a catalyst in accordance with this invention, such as, for example, aniline o-sulfonic acid, aniline m-sulfonic acid, aniline p-sulfonic acid, the diamino diphenyl sulfonic acids, the naphthyl amine sulfonic acids, the amino phenol sulfonic acids, the amino toluene sulfonic acids, phenyl taurine, sulfaminic acid, imino disulfonic acid, taurine, the amino disulfonic acids including 2-amino-toluene-3,5-disulfonic acid, the diamino disulfonic acids including 2,5-diamino benzene-1,3-disulfonic acid, and the like. As is evidenced by the foregoing list of typical examples of the type of compounds contemplated as catalysts by this invention, any compound having at least one amine group and at least one —SO$_3$H group will catalyze the condensation of thiodiglycol to advantage without the production of an appreciable quantity of ill-smelling ring compounds, and such compounds are broadly contemplated by the invention.

Although the invention is primarily concerned with the preparation of a polythioether by condensing thiodiglycol alone, it is also possible to condense thiodiglycol with one or more polyhydric alcohols in accordance with this invention using the novel catalyst. Any suitable polyhydric alcohol, such as, for example, ethylene glycol, diethylene glycol or any other suitable glycol, glycerine, trimethylol propane, pentaerythritol, sorbitol and the like, may be used. The catalyst can be used with any of these known polyhydric alcohols, so the invention in its broadest aspects contemplates the condensation with any alcohol having at least two hydroxyl groups. It is particularly desirable to use a polyhydric alcohol having at least three hydroxyl groups when it is desired to produce a polythioether having more than two terminal hydroxyl groups. The invention also contemplates including aromatic amines and aromatic amino alcohols in the reaction mixture where a basic polythioether containing nitrogen bridges is desired. Any suitable aromatic amine, such as, for example, aniline, phenylene diamine or the like, and any suitable aromatic amino alcohol, such as, for example, N,N-bis-oxethyl-aniline may be used. All such amines and amino alcohols are operable so the invention in its broadest aspects contemplates the use of any compound of these types.

The product obtained in accordance with this invention has been found particularly well suited for preparing plastics by further reaction. For example, the product can be reacted with an organic polyisocyanate in accordance with known processes, such as, for example, by mixing the polythioether with an organic polyisocyanate and a chain extender in accordance with the processes disclosed in U.S. Patent 2,764,565; 2,729,618; 2,621,166 and 2,620,516. Polyurethanes obtained by reaction of the polythioether provided by this invention and an organic polyisocyanate are particularly advantageous for making vehicle tires and various bearings and machine parts where abrasion resistance is required.

*Example 1*

About 2.4 parts by weight of m-sulfanilic acid are added to about 1220 parts by weight of thiodiglycol. The mixture is then heated to about 180° C. while stirring and passing through nitrogen and then condensed until about 130 cc. of water are split off. A yellow oil which is completely insoluble in water and which has an OH number of about 280 is obtained. The catalyst can be removed by washing the reaction product with water. The yield is about 97 percent of the theoretical.

*Example 2*

About 2 parts by weight of 2-aminotoluene-3,5-disulfonic acid are added to about 1220 parts by weights of thiodiglycol. It is condensed until about 170 cc. of water are split off. A water-jet vacuum is then applied for about another 3 hours at about 170° C. and a reaction product is obtained in about a 90 percent yield, this product solidifying at room temperature to a brown waxy substance and having an OH number of about 80.

*Example 3*

If about 1220 parts by weight of dithioglycol are condensed in vacuo by the same procedure as in Example 2, but for about 10 hours longer, using about 4 grams of phenyl taurine as catalyst, a polythioether with an OH number of about 52 is obtained in about a 90 percent yield, this polythioether also being a waxy substance with a softening point of about 50° C.

*Example 4*

About 20 parts by weight of 1-naphthylamine-3-sulfonic acid are added to about 5856 parts by weight of thiodiglycol and mixed with about 3 percent trimethylol propane. While passing through nitrogen and stirring vigorously, the condensation product is heated to about 170° C. and kept at this temperature until an OH number of about 60 is reached. A thickly liquid oil is obtained. If desired, the catalyst can be removed by washing with water.

*Example 5*

About 1413 parts by weight of thiodiglycol, about 530 parts by weights of diethylene glycol, about 465 parts by weight of aniline and about 134 parts by weight of trimethylol propane are heated together with about 15 parts by weight of m-sulfanilic acid in accordance with the procedure of Example 4. After a condensation period of about 10 hours, vacuum is applied and condensation is continued until an OH number of about 106.5 is reached. The yield of the viscous resin obtained in this way is about 2060 grams.

*Example 6*

190 grams of 1.5-naphthylene diisocyanate are mixed by stirring with 1000 grams of the polythioether obtained according to Example 4 at 124° C. The reaction is complete after 9 minutes. After stirring in 21 grams of 1.4-butylene glycol the mixture is poured into waxed molds heated to 110° C. The rubber-like moldings can be removed from the mold after 35 minutes and show the following values after having been heated for further 24 hours at 115° C.:

| | |
|---|---|
| Tensile strength | 135 kg./cm.² |
| Elongation at break | 700%. |
| Permanent elongation | 30%. |
| Loading at 20% elongation | 12 kg./cm.² |
| Loading at 300% elongation | 70 kg./cm.² |
| Ring structure | 18 kg. |
| Elasticity | 60 %. |
| Hardness | 87° Shore. |

It is to be understood that any of the other suitable compounds having amino and SO$_3$H groups contemplated herein can be substituted in the foregoing examples for the specific compound used. The foregoing examples are typical of the type of process to be used in preparing polythioethers and indicative of the type of processing conditions involved when using any of the catalysts contemplated in the broadest aspects of this invention.

Best results are obtained when the polycondensation is conducted at a temperature of at least about 100° C. Ordinarily the temperature need not exceed 200° C. so it is preferred to conduct the polycondensation at a temperature within the range of from about 100° C. to about 200° C. The condensation can be conducted at atmospheric pressure but it is preferred to reduce the pressure below atmospheric. Any amount of reduction of pressure is advantageous so it is contemplated to conduct the process at any pressure from atmospheric down to a point approaching an absolute vacuum.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for making a polythioether having terminal hydroxyl groups which comprises heating to a temperature of at least about 20° C. thiodiglycol while in admixture with a catalytic amount of a member selected from the group consisting of an aniline sulfonic acid, a diamino diphenyl sulfonic acid, a naphthyl amino sulfonic acid, an amino phenol sulfonic acid, an amino toluene sulfonic acid, phenyl taurine, sulfaminic acid, iminodisulfonic acid, taurine, an amino disulfonic acid, and a diamino disulfonic acid until condensation to form water and a polythioether having a molecular weight of at least about 500, and thereafter separating the resulting product from the water.

2. The process of claim 1 wherein the mixture is heated to a temperature of at least about 100 C. until water is split off and a polythioether is obtained.

3. The process of claim 1 wherein the mixture contains a polyhydric alcohol.

4. The process of claim 1 wherein at least the final phase of the condensation is carried out at a pressure less than atmospheric.

5. The process of claim 1 wherein the mixture contains an aromatic amine.

6. The process of claim 1 wherein the mixture contains an amino alcohol.

7. The process of claim 1 wherein the catalyst is 2-amino-toluene-3,5-disulfonic acid.

8. The process of claim 1 wherein the catalyst is phenyl taurine.

9. The process of claim 1 wherein the catalyst is naphthyl-3-sulfonic acid.

10. The process of claim 1 wherein the catalyst is amino diphenylmethane sulfonic acid.

11. The process of claim 1 wherein the catalyst is a diamino sulfonic acid.

12. The process of claim 1 wherein the catalyst is an amino disulfonic acid.

13. The method of claim 1 wherein the catalyst is m-sulfanilic acid.

References Cited in the file of this patent

UNITED STATES PATENTS

| | | |
|---|---|---|
| 2,844,566 | Schwarz et al. | July 22, 1958 |
| 2,877,190 | Canterino | Mar. 10, 1959 |